E. S. FOLK.
ROLLER BEARING.
APPLICATION FILED APR. 6, 1917.

1,230,145.

Patented June 19, 1917.

Inventor
Edward S. Folk.
By F. W. Bond
Attorney

UNITED STATES PATENT OFFICE.

EDWARD S. FOLK, OF CANTON, OHIO.

ROLLER-BEARING.

1,230,145.             Specification of Letters Patent.             Patented June 19, 1917.

Application filed April 6, 1917. Serial No. 160,108.

*To all whom it may concern:*

Be it known that I, EDWARD S. FOLK, a citizen of the United States, residing at Canton, in the county of Stark and State of Ohio, have invented a new and useful Roller-Bearing, of which the following is a specification.

The present invention relates to improvements in roller bearings and has more especial reference to a one-piece self-retaining cage for the rollers formed from sheet metal.

The object of the invention is to provide a simple construction adapted to be stamped from a single sheet of metal and bent into proper form to retain the rollers therein without weakening the material.

A further object is the provision of a roller bearing cage of this character which will be inexpensive and simple in manufacture and efficient and durable in use.

A still further object is the provision of a roller bearing cage which will permit of easily assembling the rollers therein and which will retain the rollers after being assembled.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

In the accompanying drawing.

Similar numerals of reference indicate corresponding parts throughout the several figures of the drawing.

Figure 1:
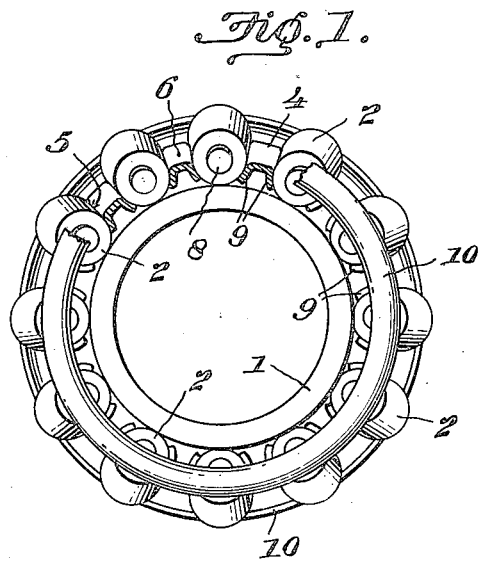
Figure 1 is a side elevation of a roller bearing embodying my invention, parts being broken away for the purpose of illustration, the outer race-ring being omitted.
Figure 2:
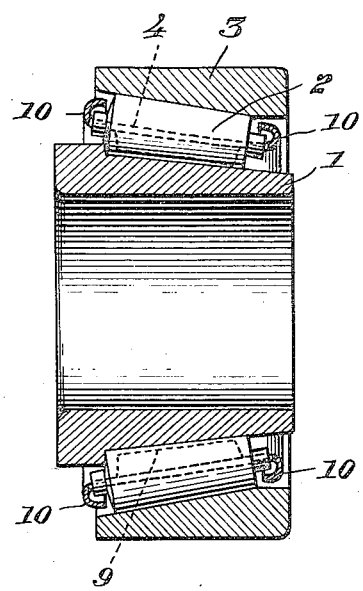
Fig. 2 is a transverse sectional view of the roller bearing.

Referring more especially to the construction illustrated in the accompanying drawings, the numeral 1 indicates the usual inner bearing ring or cone upon which the rollers 2 are supported in the usual manner, the outer surface of said cone being of the proper contour to conform with the adjacent contacting faces of the rollers. The cage which is for the purpose of retaining the rollers in proper spaced relation between the bearings 1 and 3 is stamped from a sheet of metal and comprises a frusto-conical portion 4 provided at properly spaced intervals with the longitudinally disposed slots 5, longitudinal spacing bars 6 being thus formed between the roller retaining slots.

Each of the slots 5 is provided at each extremity with a reduced portion 7 arranged to receive the reduced extremities 8 which are formed upon the rollers. An outwardly flared flange 9 projecting toward the center of the bearing is provided upon each longitudinal edge of each of the bars 6, said flanges being formed from the material which is cut out to form the slots 5.

Each edge of the cage is turned away from the center of the bearing and back over the reduced extremities 8 of the rollers, thus forming half-round beads 10, which retain the rollers within the cage. It will be understood of course that the flanges 9 are preferably curved to conform to the contour of the rollers, thus forming a trough of proper size and shape between each adjacent pair of bars 6 in which a roller is received, the flanges 9 preventing the rollers from falling through the slots 5 and the beads 10 retaining the rollers within the troughs thus formed.

Figure 3:
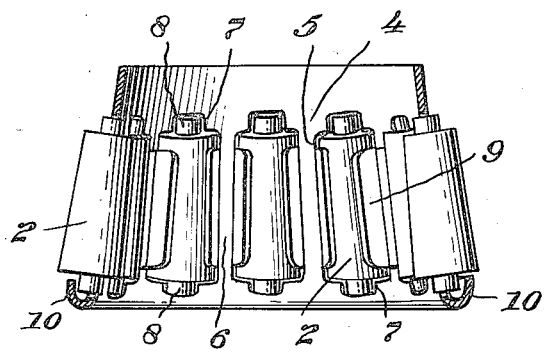
Fig. 3 is a transverse sectional view through the cage showing the rollers assembled therein before the last forming operation is completed.
Figure 4:
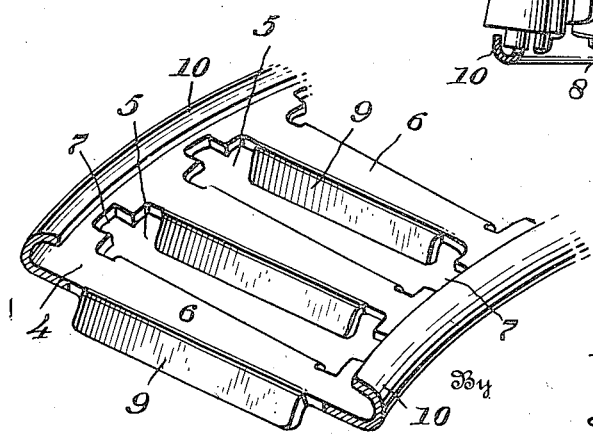
Fig. 4 is a detail perspective view upon an enlarged scale of a portion of the cage.

In assembling the rollers within the cage the cage is first formed as shown in Fig. 3 of the drawings and then placed in the position shown in said figure and the rollers placed in the proper position within the troughs formed within the cage to receive said rollers after which the upper edge of the cage is bent downwardly into a half-round bead as above described, retaining the rollers within the cage. By this construction a cage is formed which is simple and inexpensive to manufacture and which is not unnecessarily weakened and which will retain the rollers therein, the cage and rollers forming a single unit which may be easily and readily removed from a bearing or placed therein. It will also be understood that although in the drawings a conical bearing provided with conical rollers is illustrated that the rolls may be of cylindrical form and the cage properly formed to retain said rollers within a cylindrical bearing without departing from the spirit of the invention.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:—

An integral metal cage for roller bearings having a series of spaced, longitudinally disposed slots formed therein, outwardly disposed flanges provided along the edges of said slots, and an outwardly turned annular bead formed upon each edge of said cage adapted to surround the pintles of the rollers.

In testimony that I claim the above, I have hereunto subscribed my name.

EDWARD S. FOLK.